(12) United States Patent
Robert et al.

(10) Patent No.: US 11,207,986 B2
(45) Date of Patent: Dec. 28, 2021

(54) SCALED HOME ENERGY STORAGE SYSTEMS AND ASSOCIATED USES

(71) Applicant: FORD GLOBAL TECHNOLOGIES, LLC, Dearborn, MI (US)

(72) Inventors: Brian Joseph Robert, St. Clair Shores, MI (US); Rachel Blaser, New Hudson, MI (US); Renata Michaela Arsenault, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 173 days.

(21) Appl. No.: 16/273,699

(22) Filed: Feb. 12, 2019

(65) Prior Publication Data
US 2020/0254887 A1 Aug. 13, 2020

(51) Int. Cl.
*H02J 7/00* (2006.01)
*B60L 53/10* (2019.01)
(Continued)

(52) U.S. Cl.
CPC ............... *B60L 53/11* (2019.02); *B60L 50/64* (2019.02); *B60L 53/30* (2019.02); *B60L 53/305* (2019.02);
(Continued)

(58) Field of Classification Search
CPC ........ B60L 53/11; B60L 53/305; B60L 58/12; B60L 50/64; H01M 10/44; H01M 2/1077;
(Continued)

(56) References Cited

U.S. PATENT DOCUMENTS

| 8,710,795 B2 | 4/2014 | Scheucher |
| 8,903,351 B2 | 12/2014 | Berry et al. |

(Continued)

FOREIGN PATENT DOCUMENTS

| WO | 2009/124316 A1 | 10/2009 |
| WO | 2010/042550 A2 | 4/2010 |
| WO | 2018/031719 A1 | 2/2018 |

OTHER PUBLICATIONS

Powerwall Overview; Tesla © 2018; https://www.tesla.com/support/energy/learn/powerwall/overview, three pages.
(Continued)

*Primary Examiner* — Zixuan Zhou
(74) *Attorney, Agent, or Firm* — David B. Kelley; Carlson, Gaskey & Olds

(57) ABSTRACT

This disclosure details exemplary home energy storage systems capable of storing electricity locally for later consumption, such as for charging an electrified vehicle, supporting various home energy needs, and supporting alternative energy storage/power source functionality. An exemplary home energy storage system may include a stationary unit, one or more modular units removably connectable to the stationary unit, and a rack mounting and handcart transportation system configured to mount, detach, and transport the modular unit relative to the stationary unit. Once undocked from the stationary unit, the modular unit(s) may be utilized as a portable power source for powering one or more electrical loads. This disclosure further describes various interconnected functionalities (e.g., electrical and wireless communication of state of uses) between the stationary unit and the modular unit of home energy storage systems and between the modular unit and various satellite equipment associated with the modular unit.

19 Claims, 14 Drawing Sheets

(51) Int. Cl.
*H01M 10/44* (2006.01)
*B60L 53/30* (2019.01)
*B60L 58/12* (2019.01)
*H02J 7/14* (2006.01)
*B60L 50/64* (2019.01)
*H01M 50/20* (2021.01)
*H01M 16/00* (2006.01)
*B60L 53/80* (2019.01)
*H01M 10/42* (2006.01)

(52) U.S. Cl.
CPC .............. *B60L 53/80* (2019.02); *B60L 58/12* (2019.02); *H01M 10/425* (2013.01); *H01M 10/44* (2013.01); *H01M 16/00* (2013.01); *H01M 50/20* (2021.01); *H02J 7/0024* (2013.01); *H02J 7/14* (2013.01); *H01M 2220/20* (2013.01); *H02J 2310/12* (2020.01); *Y02T 10/70* (2013.01)

(58) Field of Classification Search
CPC ........... H02J 7/14; H02J 7/0027; Y02E 60/10; Y02E 10/50; Y02T 90/12; Y02T 90/14; Y02T 10/7072; Y02T 10/70
USPC .................................................. 320/101, 109
See application file for complete search history.

(56) References Cited

U.S. PATENT DOCUMENTS

| | | |
|---|---|---|
| 9,680,188 B2 | 6/2017 | O'Hora |
| 2011/0204720 A1 | 8/2011 | Ruiz et al. |
| 2011/0221384 A1* | 9/2011 | Scheucher .......... H01M 10/643 320/101 |
| 2014/0225566 A1 | 8/2014 | Scheucher |
| 2014/0327405 A1 | 11/2014 | Carkner |
| 2015/0048778 A1 | 2/2015 | Davidson |
| 2015/0239365 A1 | 8/2015 | Hyde et al. |
| 2016/0176305 A1 | 6/2016 | James et al. |
| 2017/0033337 A1* | 2/2017 | O'Hora ............... H01M 10/441 |
| 2017/0043670 A1 | 2/2017 | Zenner et al. |
| 2019/0070967 A1* | 3/2019 | Ishigaki .................. B60L 8/003 |

OTHER PUBLICATIONS

Crowe, Phillippe; Battery Swapping Station for Electric Bikes and Scooters, May 7, 2012; HybridCARS; http://www.hybridcars.com/battery-swapping-station-electric-bikes-and-scooters-45584/; three pages.

* cited by examiner

SCALED HOME ENERGY STORAGE SYSTEMS AND ASSOCIATED USES

TECHNICAL FIELD

This disclosure relates to home energy storage systems that include both a stationary unit for supporting dedicated home energy storage solutions and a modular unit capable of supporting alternative energy storage/power source functionality. This disclosure further relates to the interconnected operations between the stationary unit and the modular unit of home energy storage systems and between the modular unit and satellite equipment that may be associated with the modular unit.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on internal combustion engines to propel the vehicle.

Some vehicle (electrified or traditional internal combustion engine driven) customers may desire home energy storage systems that are capable of storing electricity locally for later consumption, such as for charging an electrified vehicle, supporting home energy needs, and/or as a portable power source for powering one or more electrical loads.

SUMMARY

A home energy storage system according to an exemplary aspect of the present disclosure includes, among other things, a stationary unit, a modular unit removably connectable to the stationary unit, and a rack mounting and handcart transportation system configured to mount, detach, and transport the modular unit relative to the stationary unit.

In a further non-limiting embodiment of the foregoing system, the stationary unit houses at least one battery array, and the modular unit removably houses at least one modular battery or battery array.

In a further non-limiting embodiment of either of the foregoing systems, the modular unit houses a generator.

In a further non-limiting embodiment of any of the foregoing systems, a battery management system includes a master controller located on the stationary unit and a slave controller located on the modular unit.

In a further non-limiting embodiment of any of the foregoing systems, the rack mounting and handcart transportation system includes a rack assembly mounted to the stationary unit and a handcart assembly mounted to the modular unit.

In a further non-limiting embodiment of any of the foregoing systems, the rack assembly includes a rack and an extension slidably received within a pocket of the rack.

In a further non-limiting embodiment of any of the foregoing systems, the handcart assembly includes a handle removably connected to the extension.

In a further non-limiting embodiment of any of the foregoing systems, the handcart assembly includes a handle attached to the modular unit and at least one set of wheels mounted to the modular unit.

In a further non-limiting embodiment of any of the foregoing systems, modular unit includes locating feet for locating the modular unit within a cargo space of a vehicle after disconnecting the modular unit from the stationary unit.

In a further non-limiting embodiment of any of the foregoing systems, the cargo space includes locating brackets configured to receive the locating feet to align a modular unit-side connector of the modular unit with a vehicle-side connector of the vehicle.

In a further non-limiting embodiment of any of the foregoing systems, the modular unit includes a plurality of inputs for connecting external power sources and a plurality of outputs for powering electrical devices.

In a further non-limiting embodiment of any of the foregoing systems, the external power sources include a portable wind turbine or a portable solar panel.

In a further non-limiting embodiment of any of the foregoing systems, a communication system is configured to achieve bidirectional communication between the stationary unit, the modular unit, a mobile device, and a vehicle over a cloud hub.

In a further non-limiting embodiment of any of the foregoing systems, the mobile device is configured to communicate with the cloud hub using an application stored in a memory of the mobile device.

In a further non-limiting embodiment of any of the foregoing systems, the modular unit is connectable to an energy system that includes a plurality of interconnected modular units after being disconnected from the stationary unit.

A method according to another exemplary aspect of the present disclosure includes, among other things, undocking a modular unit of a home energy storage system from a stationary unit of the home energy storage system, transporting the modular unit to a location remote from the stationary unit, and using the modular unit to power an external load at the location.

In a further non-limiting embodiment of the foregoing method, the method includes powering a home energy load using the stationary unit while the modular unit is disconnected from the stationary unit.

In a further non-limiting embodiment of either of the foregoing methods, undocking the modular unit includes sliding the modular unit in a direction away from the stationary unit, and disconnecting a handle of the modular unit from a rack extension of the stationary unit.

In a further non-limiting embodiment of any of the foregoing methods, transporting the modular unit includes rolling the modular unit along a ground surface with a handle and at least one set of wheels of the modular unit.

In a further non-limiting embodiment of any of the foregoing methods, the external load includes a battery pack of an electrified vehicle, a recreational vehicle, an appliance, or a personal electronic device.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary home energy storage systems capable of storing electricity locally for later consumption, such as for charging an electrified vehicle, supporting various home energy needs, and supporting alternative energy storage/power source functionality. An exemplary home energy storage system may include a stationary unit, one or more modular units removably connectable to the stationary unit, and a rack mounting and handcart transportation system configured to mount, detach, and transport the modular unit relative to the stationary unit. Once undocked from the stationary unit, the modular unit(s) may be utilized as a portable power source for powering one or more electrical loads. These and other features of this disclosure are discussed in greater detail below.

Figure 1:
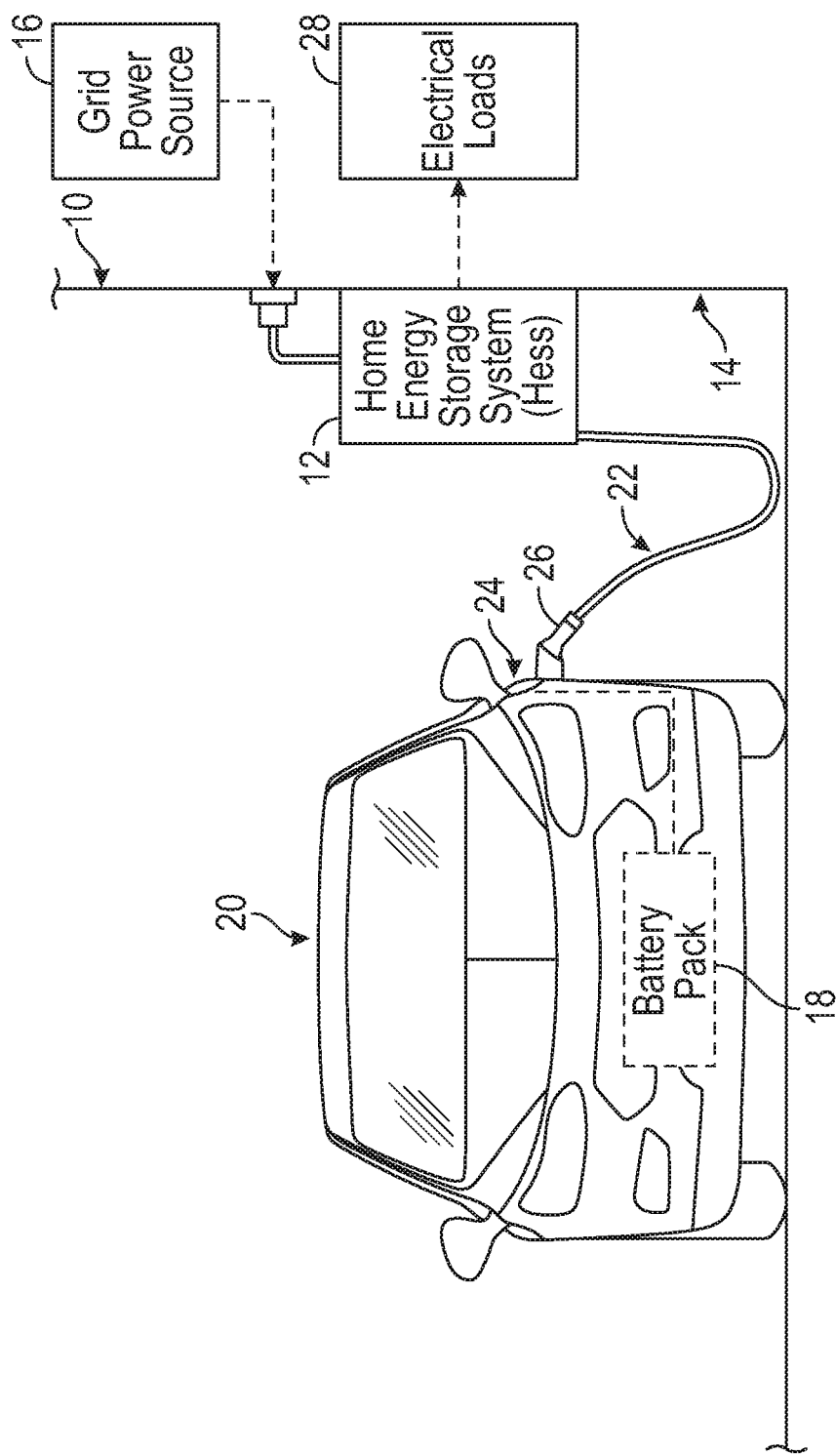
FIG. 1 schematically illustrates a structure that includes a home energy storage system.

FIG. 1 schematically depicts a structure 10. The structure 10 could be a residential building, a commercial building, a parking garage, or any other structure. In an embodiment, the structure 10 is a garage of a residential home. It should be understood that the various components of FIG. 1 are shown schematically to better illustrate the features of this disclosure and are not necessarily depicted to scale.

A home energy storage system (HESS) 12 may be mounted to a surface 14, such as a wall or a floor, of the structure 10. The HESS 12 may be electrically coupled to a grid power source 16 in a known manner. The grid power source 16 can supply power to the HESS 12. In an embodiment, the grid power source 16 is an AC power source that inputs power to the HESS 12 at either 110 volts or 220 volts. However, other power sources, including but not limited to solar, wind, or a combination of power sources, are further contemplated within the scope of this disclosure.

The power supplied to the HESS 12 may be locally stored for later consumption by various electrical loads. Thus, the HESS 12 can be used to power various electrical loads even when power is not available from the grid power source 16.

In an embodiment, the HESS 12 may be employed to charge a battery pack 18 of an electrified vehicle 20 that is parked within or near the structure 10. The battery pack 18 is an exemplary electrified vehicle battery. The battery pack 18 may be a high voltage traction battery pack that includes a plurality of battery arrays (i.e., battery assemblies or groupings of rechargeable battery cells) capable of outputting electrical power to operate the electrical loads (e.g., electric motor) of the electrified vehicle 20. The electrified vehicle 20 may include any type of electrified powertrain and may be configured as a battery electric vehicle (BEV), a hybrid electric vehicle (HEV), a plug-in hybrid electric vehicle (PHEV), a fuel cell vehicle, etc. The electrified vehicle 20 could also be car, a pickup truck, a van, a sport utility vehicle, or any other type of vehicle.

The HESS 12 may include an electric vehicle supply equipment (EVSE) 22 that can be operably connected to a vehicle inlet assembly 24 for charging the battery pack 18. The EVSE 22 may include a coupler 26 that is configured to plug into one or more ports of the vehicle inlet assembly 24 for transferring power from the HESS 12 to the battery pack 18.

The HESS 12 may also act as a backup power source for supporting various other electrical loads 28 that are separate from the electrified vehicle 20. The electrical loads 28 may include any home energy loads, including but not limited to, home appliances, home HVAC systems, home lighting systems, etc.

Portions of the HESS 12 may be portable for supporting alternative energy storage/power source functionality. The portable aspects of the HESS 12 are further detailed below.

Figure 2:
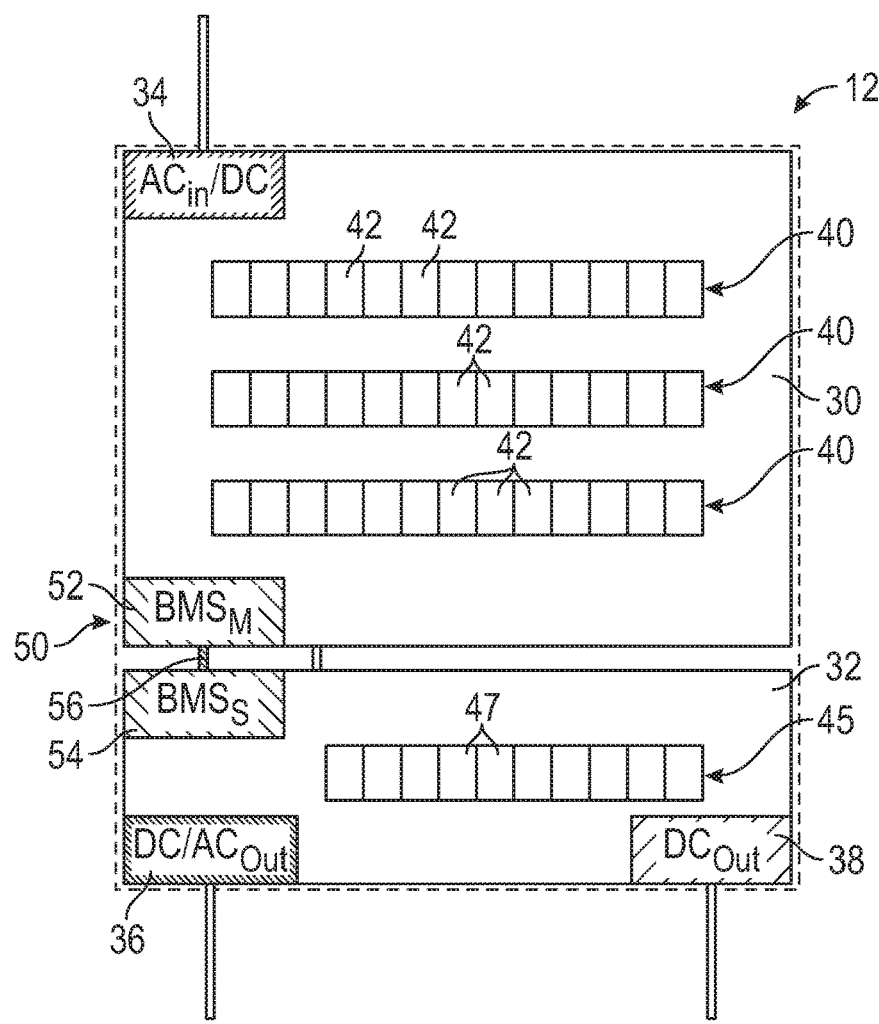
FIG. 2 schematically illustrates an exemplary home energy storage system that includes a stationary unit and a modular unit.

The HESS 12 of FIG. 1 is illustrated in greater detail in FIG. 2. The HESS 12 may include a stationary unit 30 and a modular unit 32 that is detachably connected to the stationary unit 30. The stationary unit 30 may be permanently affixed to the surface 14 of the structure 10, whereas the modular unit 32 may be detached from the stationary unit 30 and moved to a location that is remote from the structure 10. When docked, the modular unit 32 may function synchronously as part of the larger unit of the HESS 12, effectively expanding the accessible energy available to the user.

An AC/DC input 34 may be provided on the stationary unit 30 for either receiving power from the power grid source 16 (or other power source) or for discharging power from the HESS 12. A DC/AC output 36 and a DC output 38 may be provided on the modular unit 32. AC power can be delivered to external loads via the DC/AC output 36, and DC power can be delivered directly to external loads via the DC output 38. In an embodiment, the DC output 38 supports DC fast charging events. DC fast charging events are relatively immediate, rapid charge events that typically last approximately thirty minutes or less. The HESS 12 may employ DC fast charging by delivering power levels of 50 kW or more to rapidly charge an external load, as opposed to the power output of standard alternating current chargers, by way of one non-limiting example.

The stationary unit 30 may include one or more battery arrays 40 for locally storing energy for later use. The battery array(s) 40 may be housed inside a sealed enclosure of the stationary unit 30. Each battery array 40 may include a plurality of battery cells 42 or other energy storage devices capable of storing electrical power that is received from the grid power source 16. The energy stored in the battery cells 42 can be used to charge the battery pack 18 of the electrified vehicle 20 or to power the electrical loads 28, for example.

Figure 3:
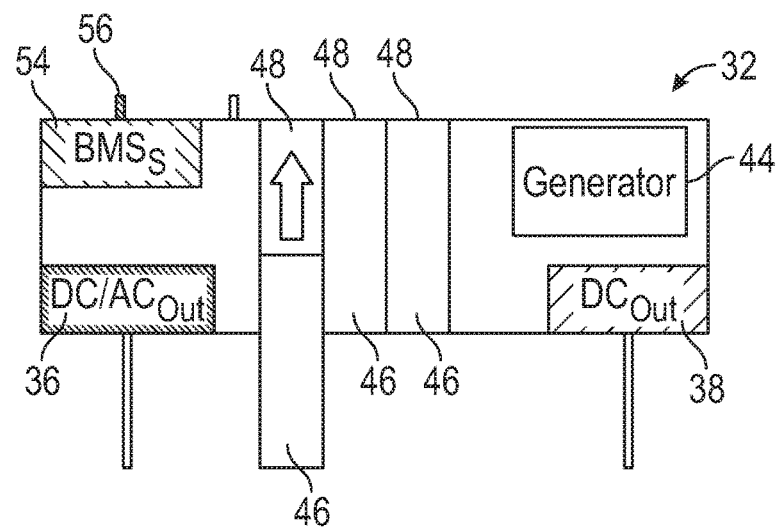
FIG. 3 schematically illustrates an exemplary modular unit of a home energy storage system.

Although a specific number of battery cells 42 are depicted in FIG. 2, each battery array 40 could employ a greater or fewer number of battery cells 42 within the scope of this disclosure. The battery cells 42 may be stacked side-by-side and then coupled together using various structures (e.g., spacers, rails, walls, plates, bindings, bus bars, etc.) to construct each battery array 40. Multiple battery arrays 40 are shown in FIG. 3, however, the stationary unit 30 of the HESS 12 could include a greater or fewer number of battery arrays within the scope of this disclosure.

In an embodiment, the battery cells 42 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

In another embodiment, the battery arrays 40 are repurposed batteries, such as repurposed electrified vehicle battery arrays. A repurposed electrified vehicle battery array is, for example, a battery array that is no longer able to fulfill the rigors of the relatively demanding vehicle propulsion duties but still has some available working capacity (e.g., 50% capacity or more). The repurposed battery array may include repurposed battery cells. In yet another embodiment, unused, or new battery arrays could be used within the stationary unit 30 of the HESS.

The modular unit 32 of the HESS 12 may also include one or more battery arrays 45 for locally storing energy for later use. The battery array(s) 45 may be housed inside a sealed enclosure of the modular unit 32. Each battery array 45 may include a plurality of battery cells 47 or other energy storage devices capable of storing electrical power. The energy stored in the battery cells 47 can be used to power various electrical loads, including loads located remotely from the HESS 12.

Referring now to FIG. 3, the modular unit 32 of the HESS 12 may include power sources in addition to or in place of the battery arrays 45. For example, the modular unit 32 may include a generator 44 and one more modular batteries 46 that provide portable energy solutions for supporting various mobility applications (e.g., e-Bike, golf cart, etc.) and customer convenience/recreational applications (camping equipment, lawn mower, drone, personal mobility scooter, etc.) when the modular unit 32 is detached from the stationary unit 30. Therefore, in addition to various interconnected functionalities (e.g., electrical and wireless communication of state of uses) that can be achieved between the stationary unit 30 and the modular unit 32 of the HESS 12, interconnected functionalities may also be achieved between the modular unit 32 and the various satellite equipment that may be associated with the modular unit 32 within the scope of this disclosure.

The generator 44 may serve various functions. For example, the generator 44 could provide energy source assistance to the modular batteries 46, could be used to automate recharging of the modular batteries 46 when the modular batteries 46 have a low state of charge, or could be used to assist the modular batteries 46 or a battery pack of an electrified vehicle for powering the electrified vehicle.

The modular batteries 46 may be removably stored within storage slots 48 of the modular unit 32. The total number of modular batteries 46 provided within the modular unit 32 is not intended to limit this disclosure. In addition, the modular batteries 46 may have the same or different storage capacities.

A battery management system 50 may control various operations associated with the HESS 12. In an embodiment, the battery management system 50 includes a master controller 52 located on the stationary unit 30 and a slave controller 54 located on the modular unit 32. The master controller 52 may communicate with the slave controller 54 over a communications path 56 using any known communications standard. The master controller 52 may communicate command signals, diagnostic information, battery information, and other relevant information over the communications path 56 for controlling the slave controller 54 when the modular unit 32 is docked relative to the stationary unit 30. In an embodiment, the master controller 52 and the slave controller 54 cooperate with one another to manage charging and discharging operations of the battery arrays 40 and the modular batteries 46.

FIGS. 4A-4D illustrate an optional rack mounting and handcart transportation system 58 of a HESS 12. The rack mounting and handcart transportation system 58 is configured to mount, detach, and transport the modular unit 32 relative to the stationary unit 30 of the HESS 12. The rack mounting and handcart transportation system 58 therefore supports the portability of the modular unit 32.

The rack mounting and handcart transportation system 58 may include a rack assembly 60 that is mounted to the stationary unit 30 and a handcart assembly 62 that is mounted to the modular unit 32. The rack assembly 60 may include a rack 64 that is mounted between the surface 14 of the structure 10 and the stationary unit 30. An extension 66 of the rack assembly may be slidably received within a pocket 68 of the rack 64 in order to removably mount the modular unit 32 to the stationary unit 30.

Figure 4A:
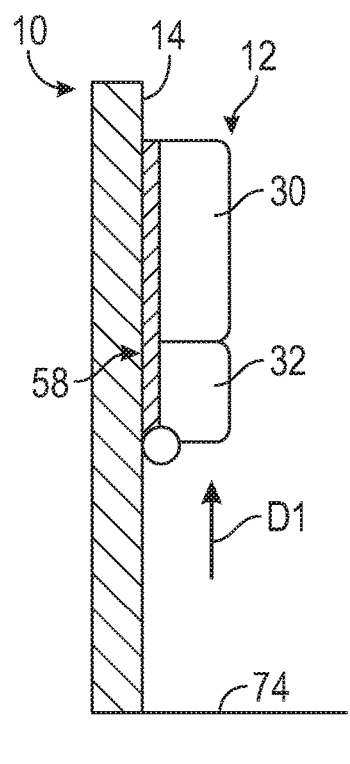
FIGS. 4A, 4B, 4C, and 4D illustrate a rack mounting and handcart transportation system of a home energy storage system.

The handcart assembly 62 may include a handle 70 and one or more sets of wheels 72. The handle 70 is fixedly secured to the modular unit 32 and may be removably attached to the extension 66 of the rack assembly 60 in order to position the extension 66 and the handle 70 within the pocket 68. For example, once connected to the extension 66, the handle 70 (and thus the modular unit 32) may be moved in a first direction D1 toward the rack 64 to dock the modular unit 32 relative to the stationary unit 30. The docked position of the modular unit 32 is shown in FIG. 4A.

Figure 4B:
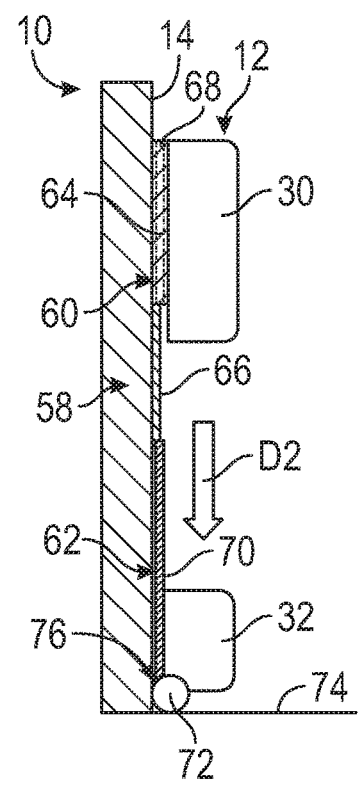

The modular unit 32 may be moved in a second direction D2 away from the rack 64 to undock the modular unit 32 from the stationary unit 30. The undocked position of the modular unit 32 is shown in FIG. 4B. In the undocked position, both the extension 66 of the rack assembly 60 and the handle 70 of the handcart assembly 62 have been slid out of the pocket 68. The extension 66 and the handle 70 may be slid in the second direction D2 until the wheels 72 contact a ground surface 74 of the structure 10. Alternatively, the modular unit 32 may be undocked from the stationary unit 30 and loaded directly into a cargo space 82 of a vehicle 20 via the rack mounting and handcart transportation system 58 (see, e.g., FIG. 4D).

Once undocked, the handle 70 may be detached from the extension 66, thereby completely separating the modular unit 32 from the remaining portions of the HESS 12. The handle 70 may then be used to transport the modular unit 32 to a location away from the stationary unit 30. This is schematically shown in FIG. 4C and FIG. 4D.

Figure 4C:
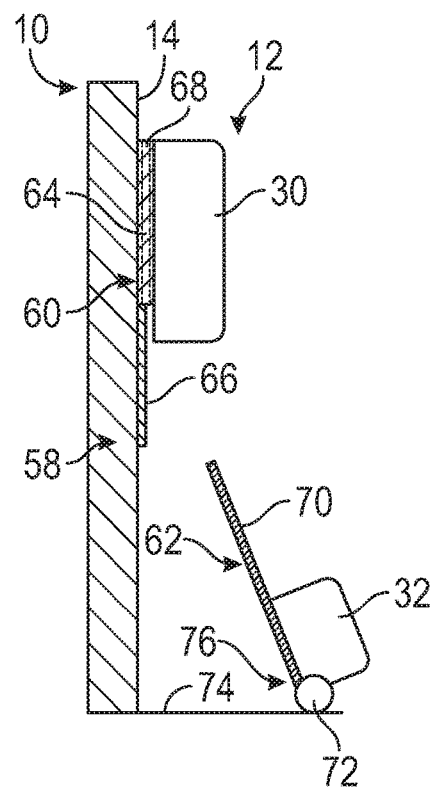
Figure 4D:
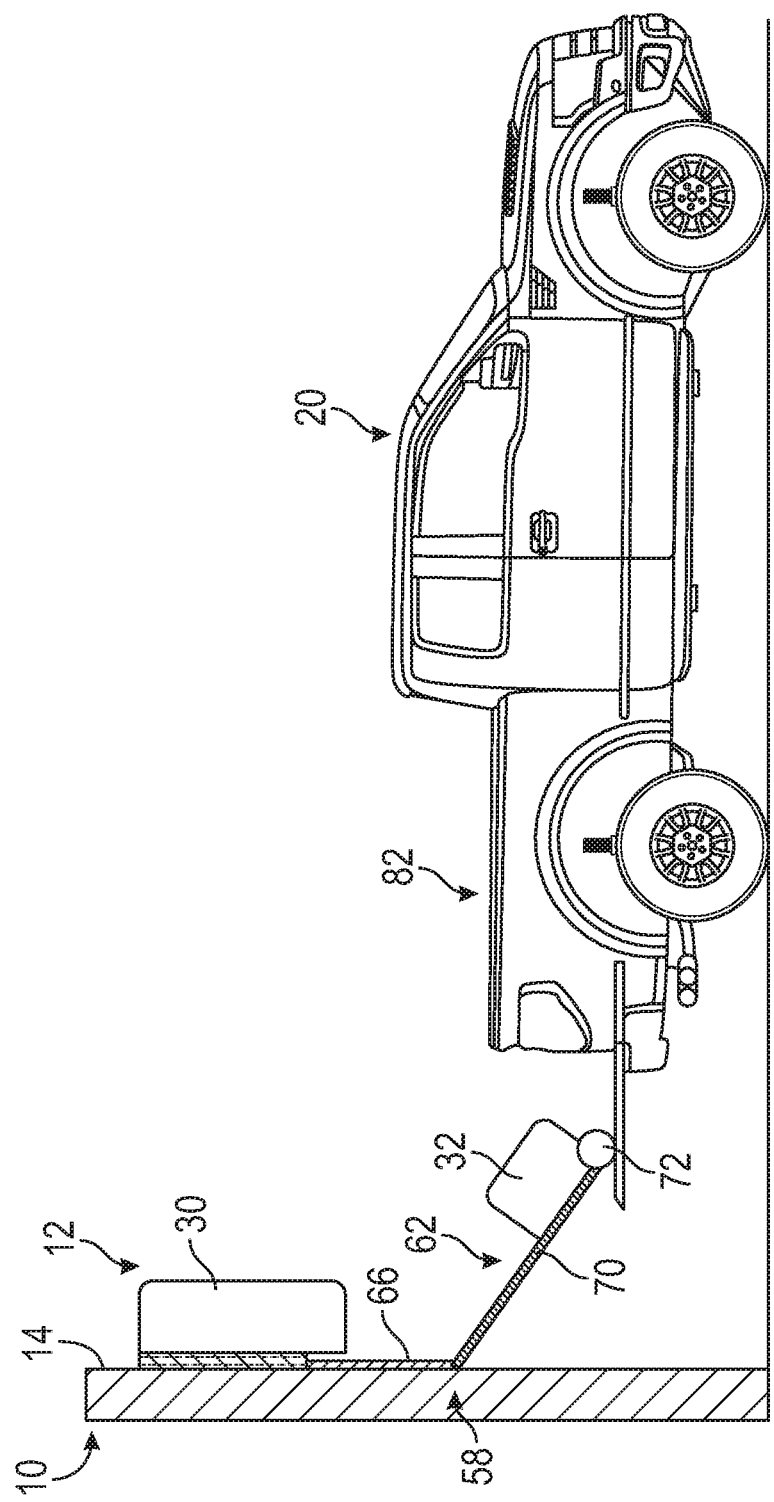
Figure 5:
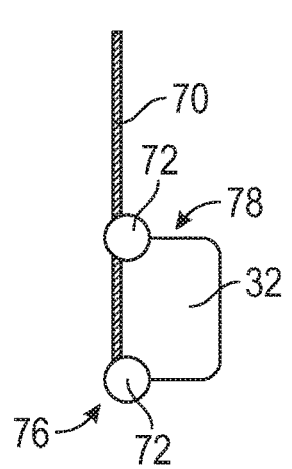
FIG. 5 illustrates an exemplary wheel configuration of a rack mounting and handcart transportation system.
Figure 6:
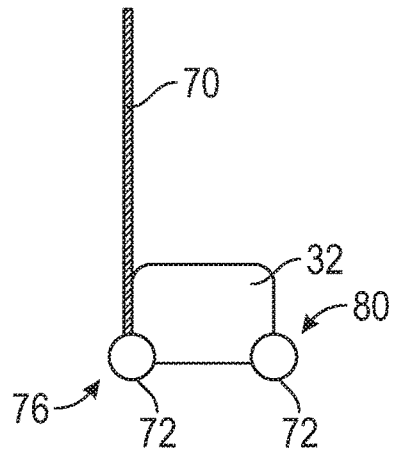
FIG. 6 illustrates another exemplary wheel configuration of a rack mounting and handcart transportation system.

In an embodiment, the handcart assembly 62 includes a single set of wheels 72 disposed near a bottom rear edge 76 of the modular unit 32 (see FIGS. 4B, 4C, and 4D). In another embodiment, the handcart assembly 62 includes two sets of wheels 72 (see FIGS. 5 and 6). One set of wheels 72 may be provided at each of the bottom rear edge 76 and a top rear edge 78 of the modular unit 32 (see FIG. 5) or at each of the bottom rear edge 76 and a bottom front edge 80 of the modular unit 32 (see FIG. 6).

Figure 7:
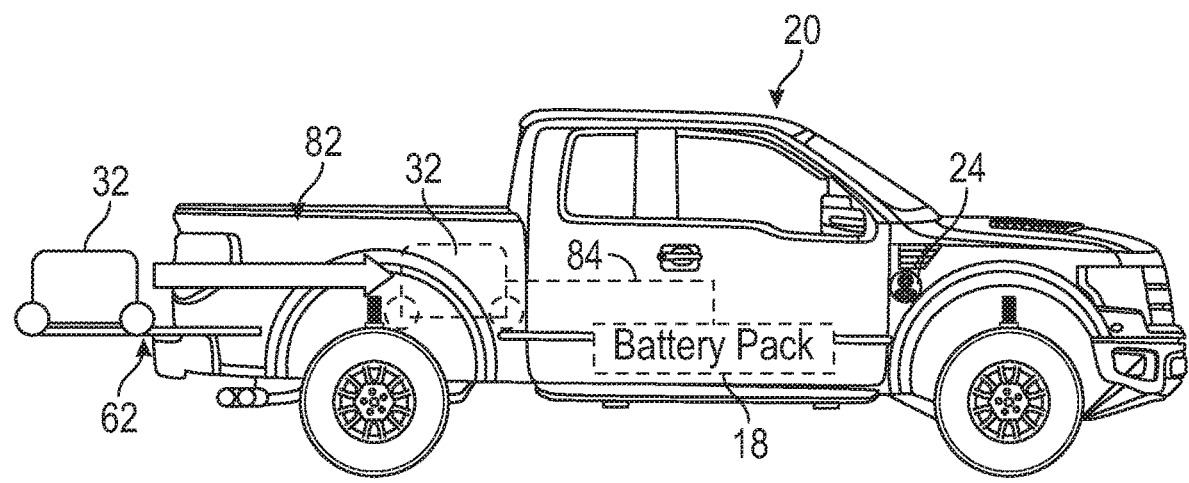
FIG. 7 schematically illustrates a modular unit of a home energy storage system connected to a vehicle.

FIG. 7 illustrates an exemplary use of the modular unit 32 of the HESS 12 after being undocked from the stationary unit 30. In this illustrated embodiment, the modular unit 32 is connected to an electrified vehicle 20 (here, a pickup truck) for enhancing the travel range of the electrified vehicle 20. However, the modular unit 32 could also be connected to conventional, internal combustion engine driven vehicles for providing an exportable power source.

The modular unit 32 may be maneuvered into position within a cargo space 82 (e.g., a truck bed or trunk) of the electrified vehicle 20, such as by using the handcart assembly 62. A wiring harness 84 may electrically connect the modular unit 32 to the battery pack 18 of the electrified vehicle 20. The energy stored within the modular unit 32 can be used in conjunction with the energy stored within the battery pack 18 to extend the electric driving range of the electrified vehicle 20. The modular unit 32 could alternatively or additionally be utilized for exporting power to worksite tools or for recharging the battery pack 18 of the electrified vehicle 20 (i.e., by connecting an EVSE between the modular unit 32 and the vehicle inlet assembly 24).

Figure 8:
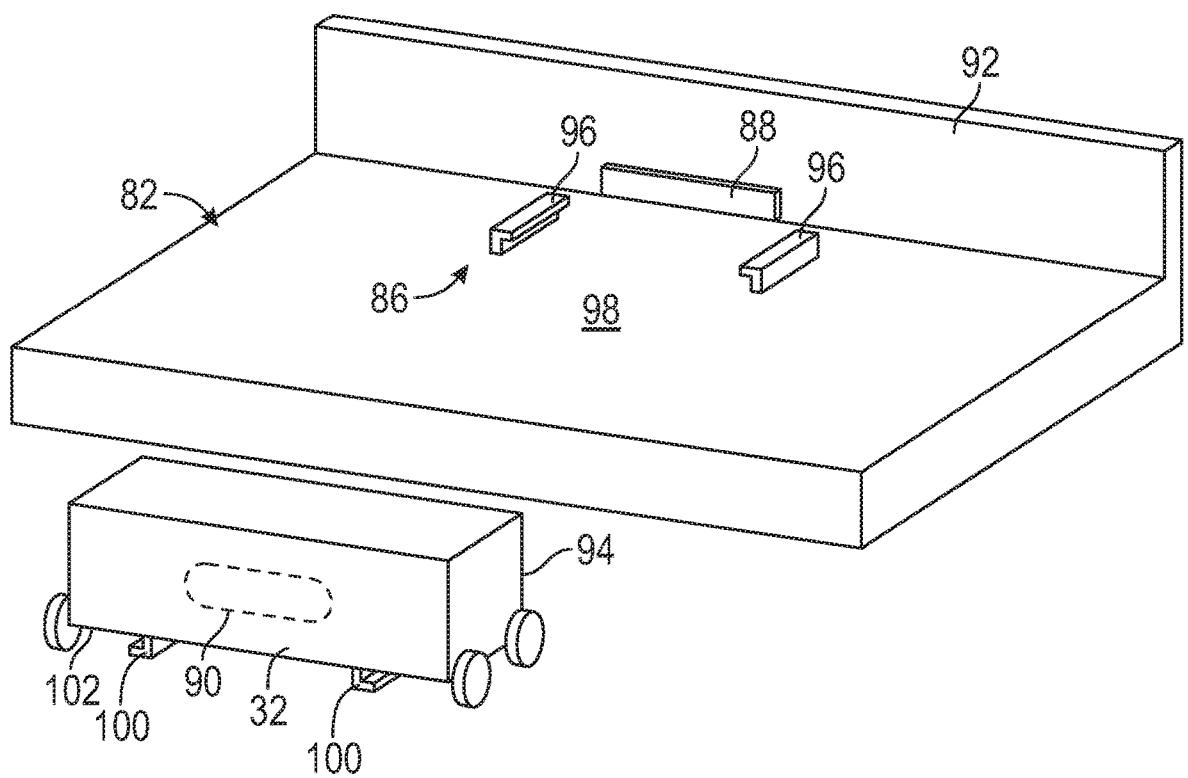
FIG. 8 illustrates a connection system for connecting a modular unit of a home energy storage system to a vehicle.

FIG. 8 illustrates an exemplary connection system 86 for electrically connecting the modular unit 32 of the HESS 12 to the electrified vehicle 20 after undocking the modular unit 32 from the stationary unit 30. The connection system 86 may include a vehicle-side connector 88 and a modular unit-side connector 90. In an embodiment, the vehicle-side connector 88 is at least partially disposed within a wall 92 of the cargo space 82, and the modular unit-side connector 90 is at least partially disposed in an outer wall 94 of the modular unit 32. The modular unit-side connector 90 may be plugged into the vehicle-side connector 88 to connect the modular unit 32 to the battery pack 18 of the electrified vehicle 20.

The connection system 86 may additionally include one or more locating features for aligning the modular unit-side connector 90 with the vehicle-side connector 88 as the modular unit 32 is moved into position within the cargo space 82. In an embodiment, the connection system 86 includes locating brackets 96 that are mounted to a floor 98 of the cargo space 82 at a location adjacent to the wall 92. Each locating bracket 96 may be generally L-shaped, for example. The modular unit 32 may include locating feet 100 that protrude from a bottom wall 102 of the modular unit 32. The locating feet 100 may be generally L-shaped, for example. The locating feet 100 may be slid underneath the locating brackets 96 to align the modular unit-side connector 90 with the vehicle-side connector 88. Therefore, as the modular unit 32 is moved further toward the wall 92, the modular unit-side connector 90 is properly positioned for engaging the vehicle-side connector 88.

Figure 9:
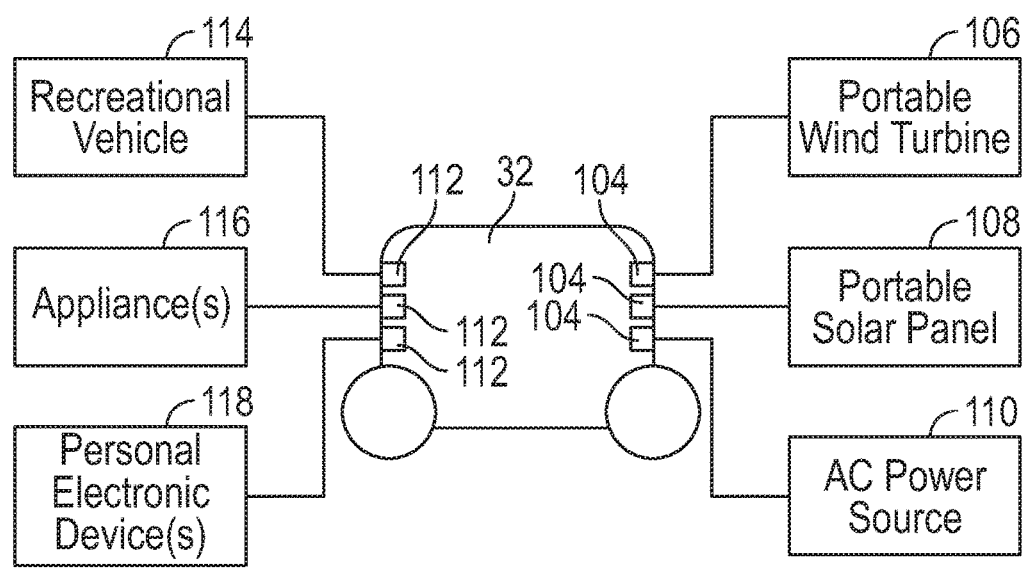
FIG. 9 schematically illustrates various inputs and outputs of a modular unit of a home energy storage system.

FIG. 9 schematically depicts a modular unit 32 of a HESS 12 as a portable power source. The modular unit 32 may include multiple inputs 104 for attaching various accessory devices to the modular unit 32. In an embodiment, the accessory devices may add power to the modular unit 32. The total number of inputs 104 provided on the modular unit 32 is not intended to limit this disclosure.

In an embodiment, a portable wind turbine 106 is connectable to one of the inputs 104. In another embodiment, a portable solar panel 108 is connectable to one of the inputs 104. In yet another embodiment, an AC power source 110 is connectable to one of the inputs 104. Various other accessory devices could alternatively or additionally be connected to the modular unit 32 within the scope of this disclosure.

The modular unit 32 may additionally include multiple outputs 112 for powering various electrical devices using the power stored within the modular unit 32 (e.g., within the modular batteries 46 and/or by using the generator 44). The total number of outputs 112 provided on the modular unit 32 is not intended to limit this disclosure.

In an embodiment, the modular unit 32 may be utilized to power a recreational vehicle 114 (e.g., camper) via one of the outputs 112. In another embodiment, the modular unit 32 may be utilized to power one or more appliances 116 (e.g., refrigerator, etc.). In yet another embodiment, the modular unit 32 may be utilized to charge one or more personal electronic devices 118 (e.g., cell phone, tablet, computer, etc.). Various other electrical devices could alternatively or additionally be powered by the modular unit 32 within the scope of this disclosure.

The inputs 104 and the outputs 112 of the modular unit 32 can be configured as various connectors or combinations of connectors. For example, the inputs 104 and the outputs 112 could be 240V AC outlets, 120V AC outlets, USB ports, or any combination of these or other connectors.

Figure 10:
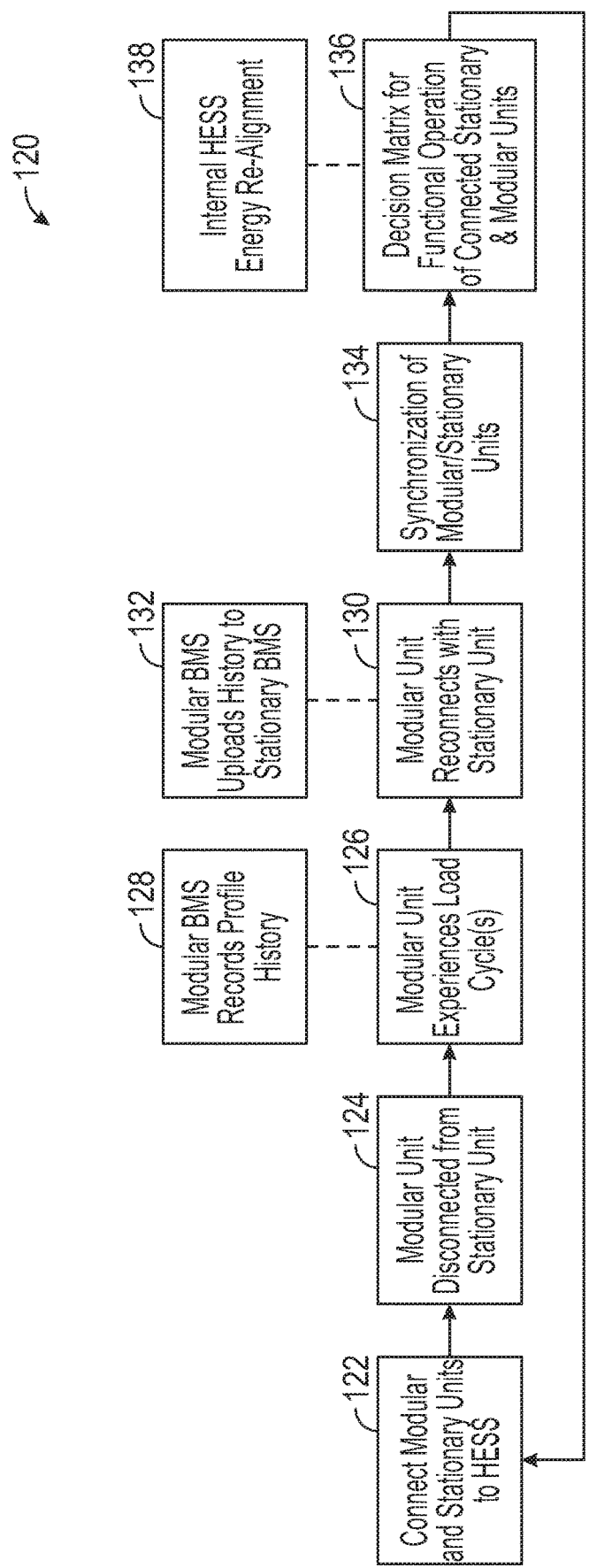
FIG. 10 is an operational interconnect flow chart for synchronizing operation of a stationary unit and a modular unit of a home energy storage system.

FIG. 10, with continued reference to FIGS. 1-9, is an operational flow chart 120 that schematically depicts the synchronized operation of the modular unit 32 and the stationary unit 30 of a HESS 12. The stationary unit 30 and the modular unit 32 are connected at block 122. The battery management system 50 may synchronize operation of the stationary unit 30 and the modular unit 32 when the modular unit 32 is docked together with the stationary unit 30. The synchronized operation of the stationary unit 30 and the modular unit 32 may be achieved via either physical or cloud data communications.

The modular unit 32 may be periodically disconnected from the stationary unit 30 (see, e.g., block 124), such as to support alternative energy storage/power source functionality. As shown at block 126, the modular unit 32 experiences load cycles each time it is used as a portable power source. The slave controller 54 of the modular unit 32 may record the usage history (e.g., periods of discharge, charge, rest, etc.) of the modular unit 32 each time the modular unit 32 is used in the undocked state at block 128.

At some later point in time, the modular unit 32 may be reconnected to the stationary unit 30 (see block 130). When re-docked, the modular unit 32 may function synchronously as part of the larger unit of the HESS 12, effectively expanding the accessible energy available to the user. Once re-docked, the slave controller 54 of the modular unit 32 may upload the usage history associated with the modular unit 32 to the master controller 52 of the stationary unit 30 (see block 132). The usage of the stationary unit 30 and the modular unit 32 may then be synchronized by the battery management system 50 at block 134.

Figure 11:
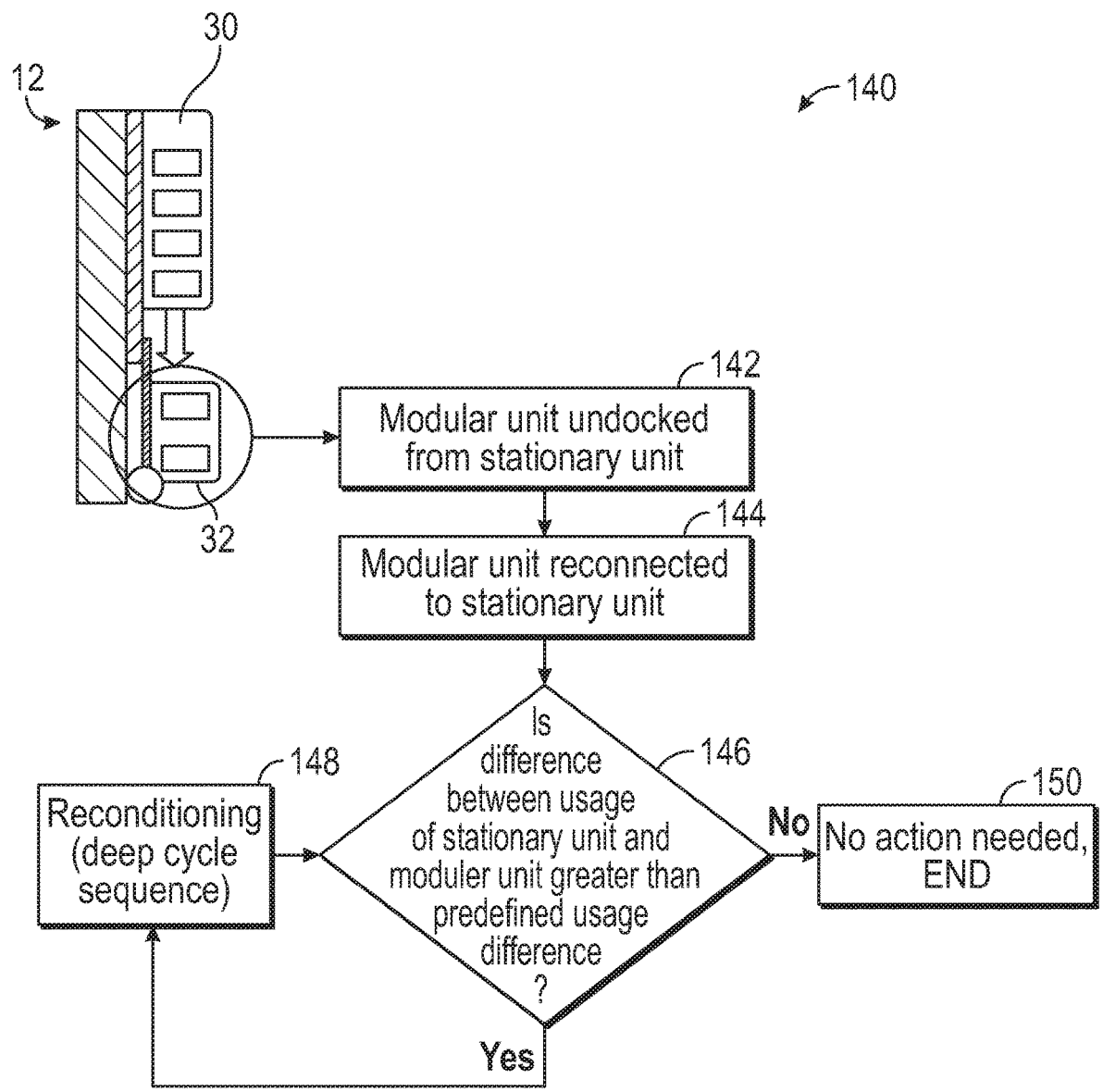
FIG. 11 illustrates an exemplary divergent aging effect strategy for a home energy storage system.
Figure 12:
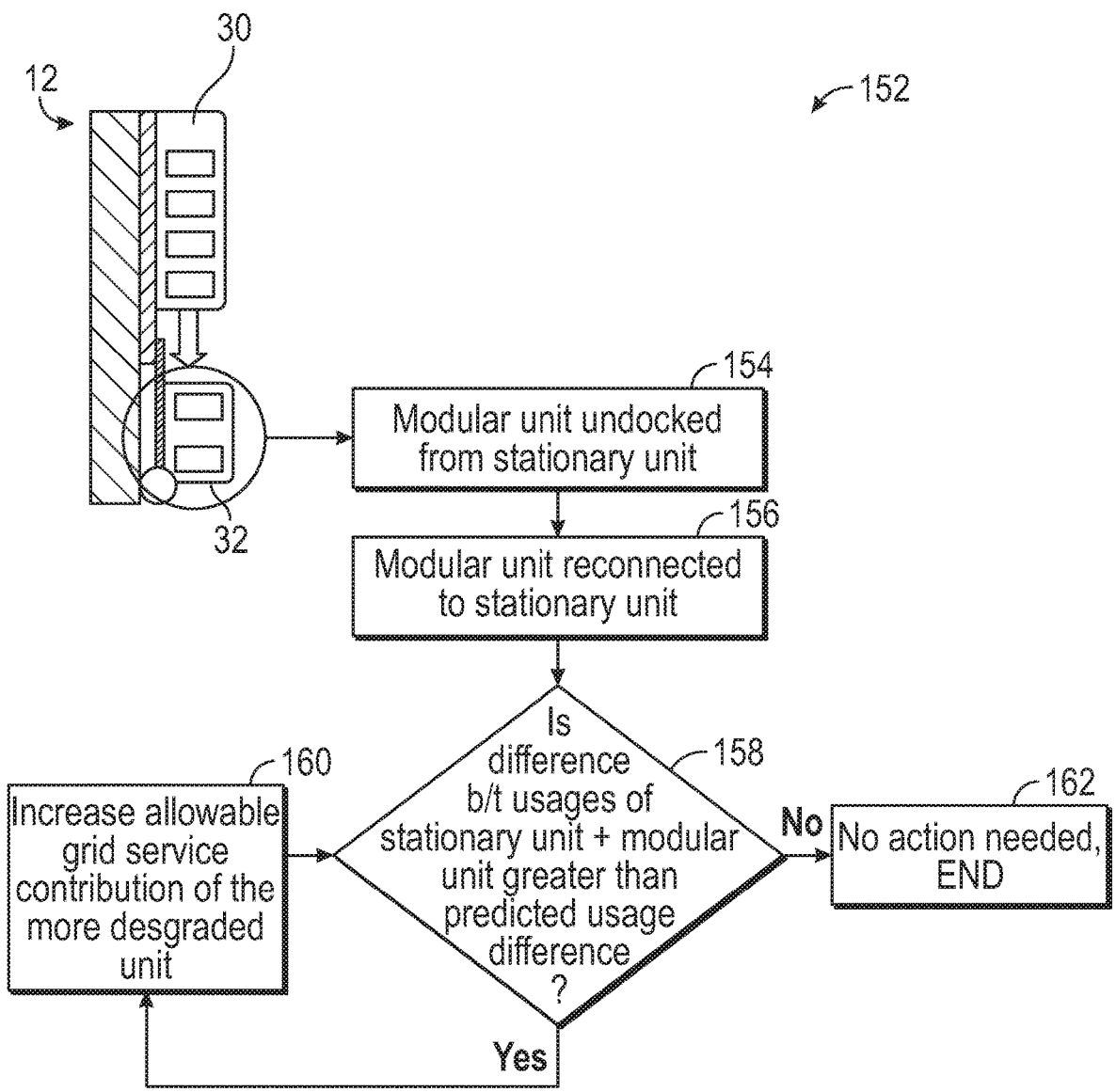
FIG. 12 illustrates an exemplary divergent aging effect strategy for a home energy storage system.

In an embodiment, the synchronization of the stationary unit 30 and the modular unit 32 involves getting both units to a common state of charge and may use various strategies to narrow any divergence in aging that has occurred while the stationary unit 30 and the modular unit 32 are being operated separately (see FIGS. 11-12). The cycles involved during the synchronization of the stationary unit and the modular unit 32 may involve unique charge/discharge sequences, voltage limits etc., that are intended to converge the states of health of each of the batteries of the stationary unit 30 and the modular unit 32 for providing optimal integrated system performance.

A decision matrix for operating the connected stationary unit 30 and modular unit 32 may be created by the battery management system 50 at block 136. The decision matrix may include various power interconnection considerations, including but not limited to, relative battery cell aging/battery cell life differentials, relative battery cell balancing, adjusted operational margins, etc. The battery management system 50 may then realign the energy settings of the HESS 12 at block 138, such as by setting the state of charge (SOC) of the HESS 12 and updating functional margins.

The stationary unit 30 and the modular unit 32 of the HESS 12 may experience unequal throughputs that result in divergent aging profiles when the modular unit 32 is undocked relative to the stationary unit 30. Divergent aging strategies may therefore be executed to address any divergent aging that may occur between the energy storage devices of the stationary unit 30 and the modular unit 32.

FIG. 11 illustrates a first exemplary method 140 for addressing divergent aging that may occur over time between the stationary unit 30 and the modular unit 32 of the HESS 12. The modular unit 32 may be undocked from the stationary unit 30 of the HESS 12 at block 142. The modular unit 32 and the stationary unit 30 may each undergo an "X" amount of throughput in a "Y" amount of time when the modular unit 32 is undocked from the stationary unit 30. The amount of throughput and time is tracked and recorded by the slave controller 54 of the modular unit 32 and the master controller 52 of the stationary unit 30, respectively.

At some subsequent point in time after being undocked, the modular unit 32 may be reconnected to the stationary unit 30 (see block 144). Once reconnected, the slave controller 54 of the modular unit 32 may upload the usage history associated with the modular unit 32 to the master controller 52 of the stationary unit 30. The usage history may include information such as state of charge, state of health, amount of throughput, etc.

Next, a block 146, the battery management system 50 of the HESS 12 may determine whether a difference between usages of the stationary unit 30 and the modular unit 32 over a certain amount of time is greater than a predefined acceptable usage difference. If YES, the battery management system 50 may command a reconditioning cycle of the more degraded unit at block 148. The reconditioning cycle may involve experimentally optimized cycling algorithms where the current, voltage, charge discharge profile, and voltage and temperature limits are varied to remove the reversible consequences of the aging experienced while the modular unit 32 and the stationary unit 30 are being operated independently (separated). If a NO flag is returned at block 146, no action is taken and the method 140 may end at block 150.

FIG. 12 illustrates a second exemplary method 152 that may be executed for addressing divergent aging between the stationary unit 30 and the modular unit 32 of the HESS 12. The modular unit 32 may be undocked from the stationary unit 30 at block 154. The stationary unit 30 and the modular unit 32 may each undergo an "X" amount of throughput in a "Y" amount of time when the modular unit 32 is undocked from the stationary unit 30. The amount of throughput and time is tracked and recorded by the master controller 52 of the stationary unit 30 and the slave controller 54 of the modular unit 32, respectively.

At some subsequent point in time after being undocked, the modular unit 32 may be reconnected to the stationary unit 30 (see block 156). Once reconnected, the slave controller 54 of the modular unit 32 may upload the usage history associated with the modular unit 32 to the master controller 52 of the stationary unit 30. The usage history may include information such as state of charge, state of health, amount of throughput, etc.

Next, a block 158, the battery management system 50 may determine whether a difference between usages of the stationary unit 30 and the modular unit 32 over a certain amount of time is greater than a predefined acceptable usage difference. If YES, the battery management system 50 may command an increase in the allowable grid service contribution of the more degraded unit at block 160. In this scenario, it may be decided that the economic advantage realized in maximizing the meter energy storage more than compensates for added battery throughput/aging, and accordingly it may be preferred to preferentially accelerate the 'aging' of the modular unit 32 to synchronize the state of health with the more heavily used stationary unit 30. If a NO flag is returned at block 158, no action is taken and the method 152 may end at block 162.

In another embodiment, the method 140 of FIG. 11 and the method 152 of FIG. 12 can be executed in parallel with one another to address any divergent aging that may occur between the stationary unit 30 and the modular unit 32. Execution of both the method 140 and the method 152 in parallel may provide for a more rapid convergence of the aging profiles of the stationary unit 30 and the parallel unit 32.

Figure 13:
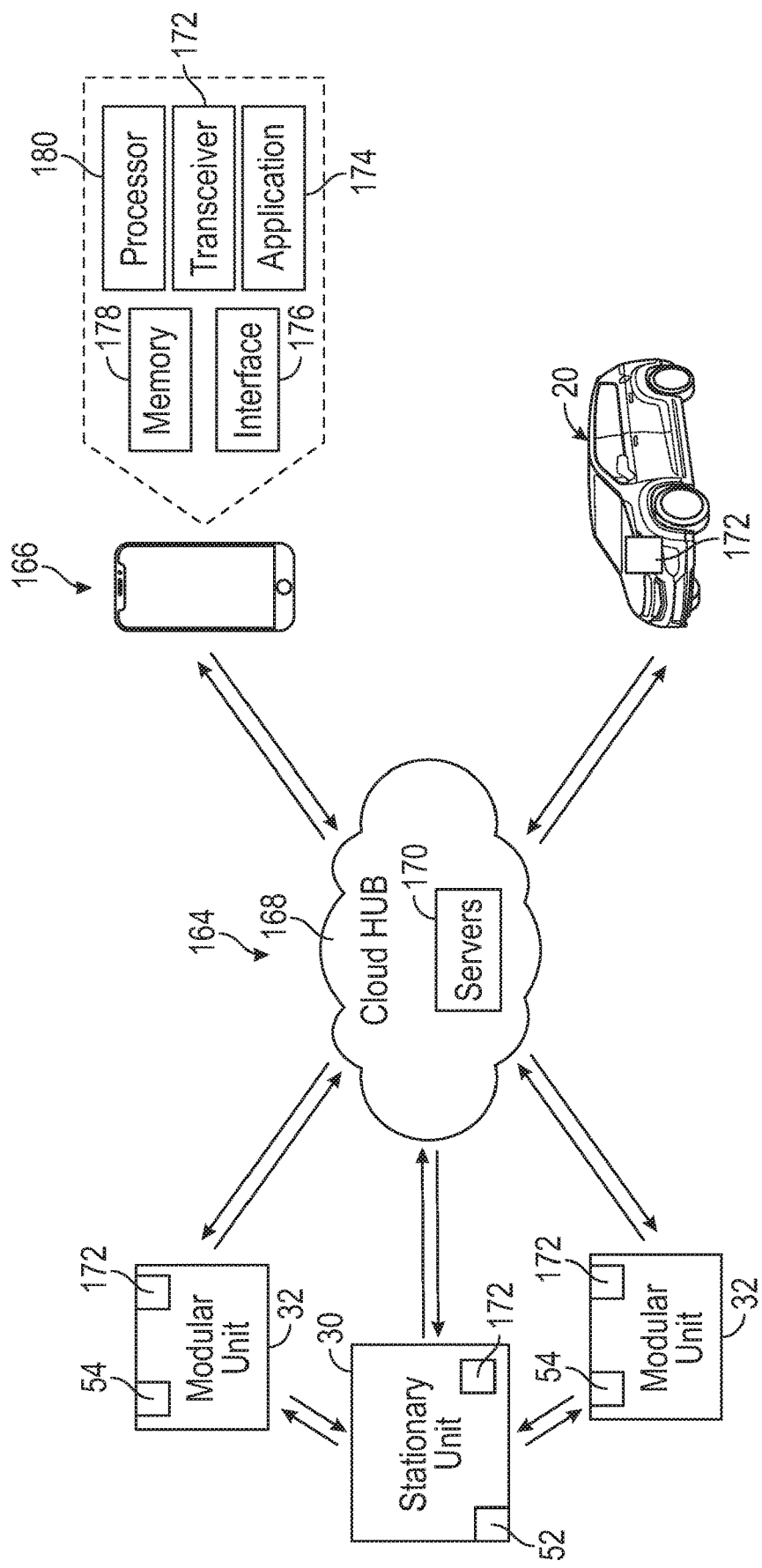
FIG. 13 schematically illustrates a communication system of a home energy storage system.

FIG. 13 schematically illustrates a communication system 164 for achieving bidirectional communication between the HESS 12 and both a mobile device 166 of an owner/user of the HESS 12 and an electrified vehicle 20 of the owner/user. The mobile device 166 (e.g., a smart phone, tablet, computer, wearable smart device, etc.) in most implementations belongs to the owner/user of the HESS 12 and the electrified vehicle 20.

The HESS 12, the mobile device 166, and the electrified vehicle 20 may be configured to communicate with one another over a cloud hub 168 (i.e., the internet) to obtain various information stored on one or more servers 170. Each server 170 can identify, collect, and store user data associated with the mobile device 166 and the electrified vehicle 20 for validation purposes. Upon an authorized request, data may be subsequently transmitted to or from the HESS 12 via a cellular tower or some other known communication technique (e.g., Wi-Fi, Bluetooth, etc.). The stationary unit 30 of the HESS, one or more modular units 32 of the HESS 12, the mobile device 166, and the electrified vehicle 20 may each include one or more transceivers 172 for achieving bidirectional communication and connectivity with one another over the cloud hub 168. For example, the transceivers 172 can receive data from the servers 170 or can communicate data back to the servers 170 via the employed communication technique/protocols. Although not necessarily shown or described in this highly schematic embodiment, numerous other components may enable bidirectional communication between the HESS 12, the mobile device 166, and the electrified vehicle 20. Communications between the HESS 12, the mobile device 166, and the electrified vehicle 20 may occur over a wireless link, an Internet connection, or some combination of these.

In another embodiment, one or both of the stationary unit 30 and the modular unit 32 of the HESS 12 may include wireless or direct Ethernet connections. The Ethernet connections may be utilized for connecting to and communicating with the electrified vehicle 20, and the wireless connections may be utilized for connecting to and communicating with the mobile device 166.

The mobile device 166 may include an application 174 that includes programming to allow the user to employ a user interface 176 to selectively control aspects of the HESS 12 and/or the electrified vehicle 20. The application 174 may be stored in memory 178 of the mobile device 166 and may be executed by a processor 180 of the mobile device 166.

Figure 14:
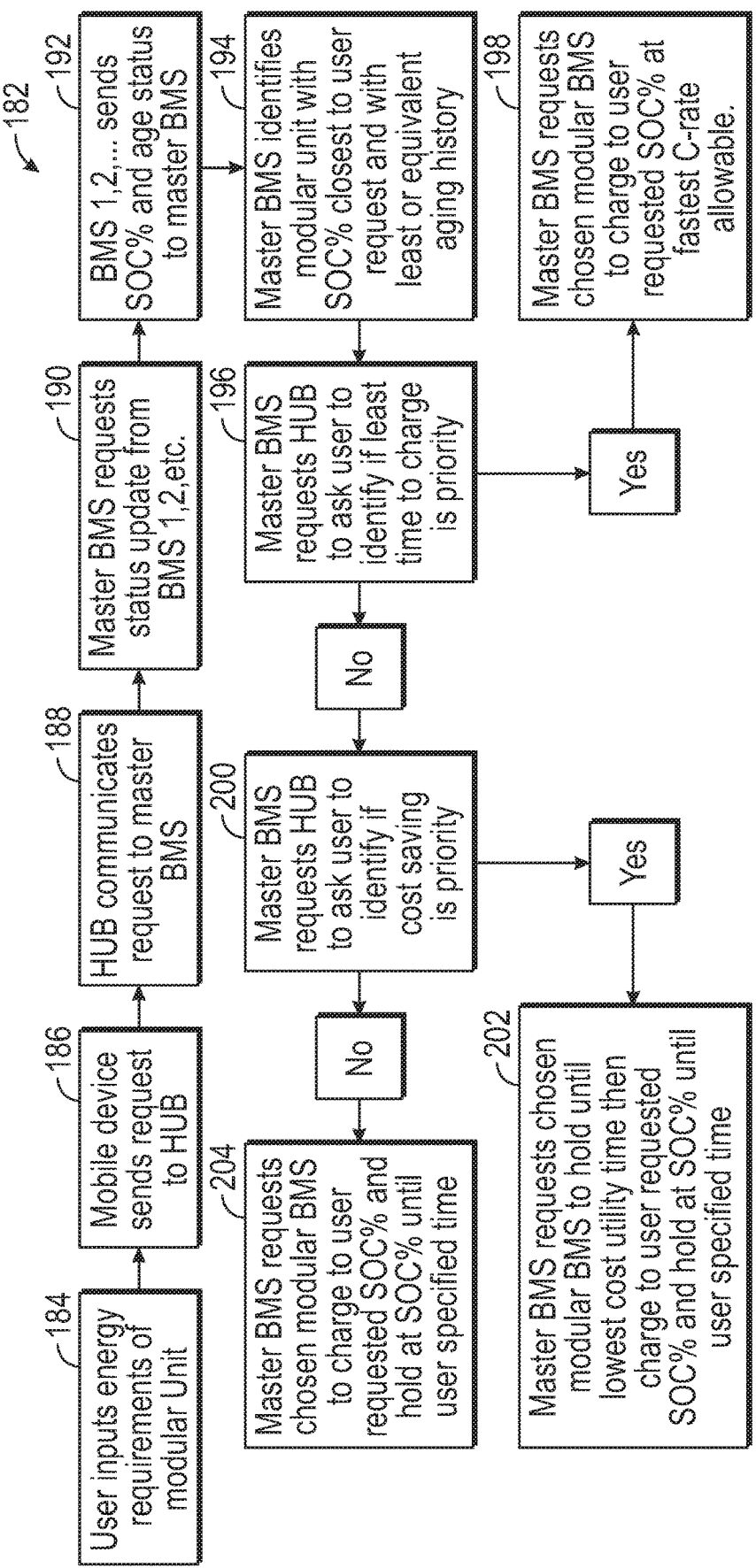
FIG. 14 is a flow chart depicting an exemplary communication protocol for communicating between a home energy storage system and a user based on a user request for modular unit usage.

FIG. 14, with continued reference to FIG. 13, illustrates a first exemplary communications method 182 for communicating between the HESS 12 and the mobile device 166 of the user. The communications method 182 may be used, for example, when the owner/user requests a specific usage of the modular unit 32 of the HESS 12.

First, a block 184, the user may specify the specific energy requirements he/she desires the modular unit 32 to be capable of addressing once undocked from the stationary unit 30. For example, the user may input, via the application 174 of the mobile device 166, a specific state of charge (in percentage) or specific amount of usage time that is required for supporting portable energy loads. A user interface of the electrified vehicle 20 could alternatively be utilized to specify the desired state of charge.

Next, at block 186, the mobile device 166 (or the electrified vehicle 20) may communicate a request of the specific energy requirements to the cloud hub 168. The cloud hub 168 may then communicate the request for the specific energy requirements to the master controller 52 of the stationary unit 30 at block 188. In turn, the master controller 52 may request status updates from each of the modular units 32 at block 190. The slave controllers 54 of the modular units 32 may subsequently send status information (e.g., state of charge, age status, etc.) to the master controller 52 at block 192.

The master controller 52 may next, at block 194, identify the modular unit 32 having the state of charge and age status that is the closest to the specific energy requirements previously requested by the user (i.e., at block 184). The master controller 52 may then request the cloud hub 168 to ask the user to identify whether the least amount of time to charge is a priority at block 196. If YES, the communications method 182 proceeds to block 198 at which the master controller 52 requests the slave controller 54 of the chosen modular unit 32 to charge to the specific energy requirements requested by the user at the fastest allowable charging rate. Alternatively, if block 196 returns a NO flag, the communications method 196 may instead proceed to block 200.

At block 200, the master controller 52 requests the cloud hub 168 to ask the user to verify whether cost savings is a priority. If YES, the master controller 52 may request the slave controller 54 of the chosen modular unit 32 to delay charging of the modular unit 32 until a lower cost utility charging time occurs and then charge the modular unit 32 to the requested energy requirements (see block 202). If NO, the master controller 52 may request the slave controller 54 of the chosen modular unit 32 to immediately charge the modular unit 32 to the requested energy requirements and hold the modular unit 32 at the requested energy requirements until a later, user specified time (see block 204).

Figure 15:
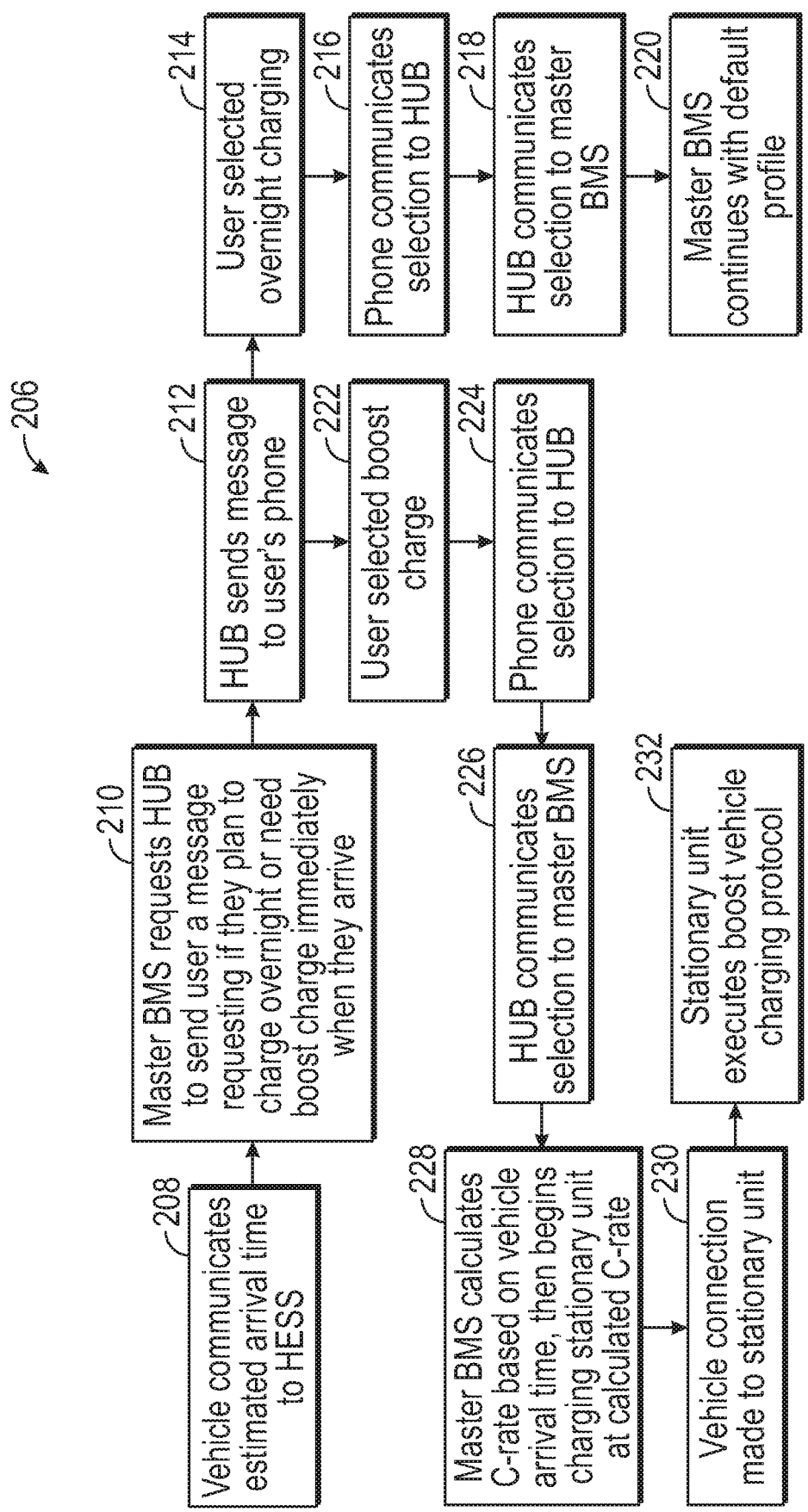
FIG. 15 is a flow chart depicting another exemplary communication protocol for communicating between a home energy storage system and a user based on a vehicle charge need prediction.

FIG. 15, with continued reference to FIG. 13, illustrates a second exemplary communications method 206 for communicating between the HESS 12 and the mobile device 166 of the owner/user. The communications method 182 may be used, for example, to communicate a charge need prediction associated with the electrified vehicle 20 to the HESS 12.

First, a block 208, the electrified vehicle 20 may communicate an estimate time of arrival (i.e., for arriving at the location of the HESS 12) to the master controller 52. The master controller 52 may then request the cloud hub 168 to send a message to the mobile device 166 of the user at block 210 requesting the user to indicate whether they plan to charge the electrified vehicle 20 overnight or whether they desire to boost charge the electrified vehicle 20 immediately upon arriving at the HESS 12. The cloud hub 168 may send the request to the mobile device 166 at block 212.

If the user selects overnight charging at block 214, a message from the mobile device 166 indicating such a selection is sent to the cloud hub 168 at block 216. The cloud hub 168 may then communicate the selection to the master controller 52 at block 218. The master controller 52 of the battery management system 50 may then continue with a default charging profile at block 220.

If, alternatively, the user selects boost charging at block 222, a message from the mobile device 166 indicating such a selection is sent to the cloud hub 168 at block 224. The cloud hub 168 may then communicate the selection to the master controller 52 at block 226. Next, at block 228, the master controller 52 of the battery management system 50 may calculate a charging rate for charging the electrified vehicle 20 based on the estimated time of arrival of the electrified vehicle 20 and begin charging the stationary unit 30 at the calculated charging rate.

At block 230, the electrified vehicle 20 may be connected to the HESS 12 for charging. The HESS 12 may then execute the boost charging protocol on the electrified vehicle 20 at block 232.

Figure 16:
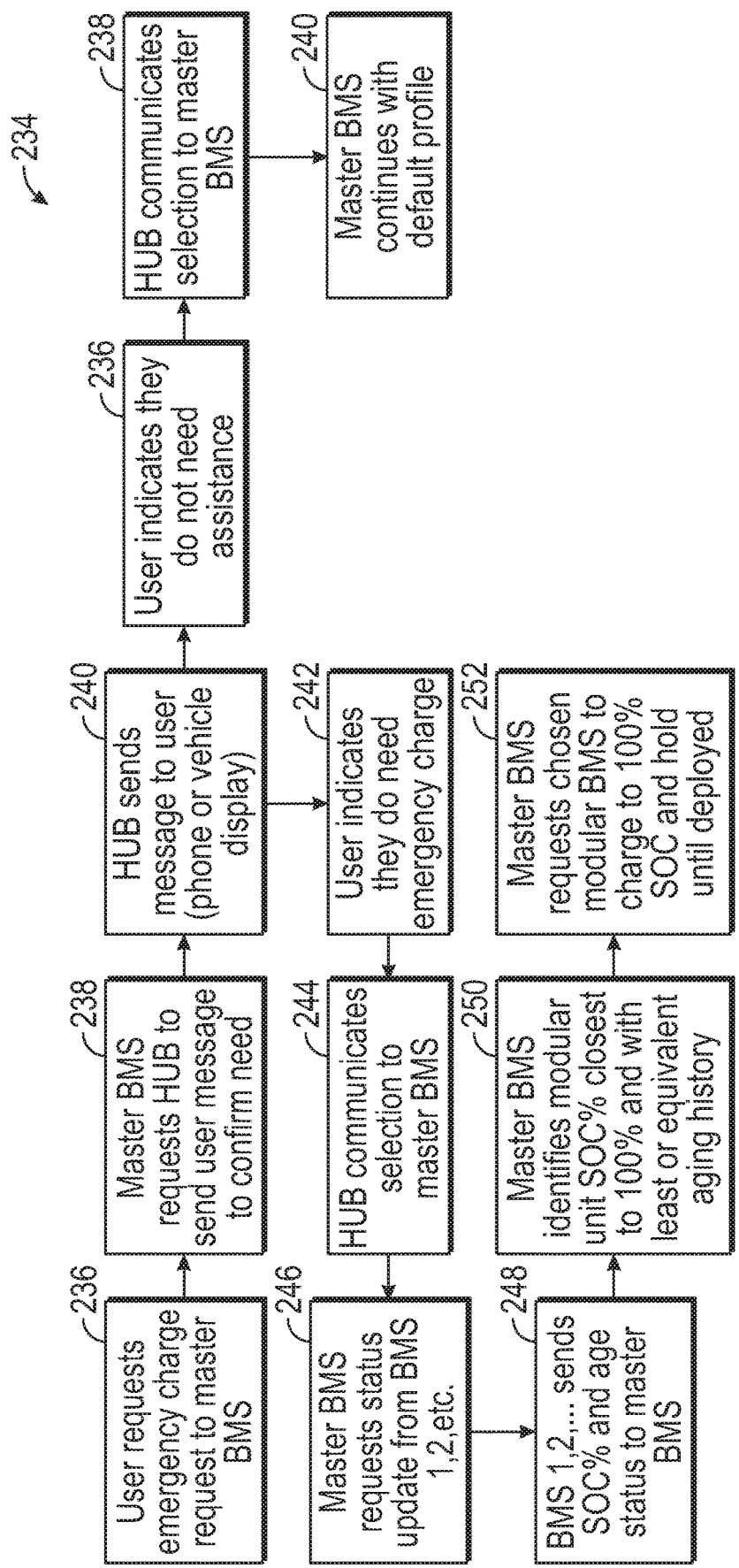
FIG. 16 is a flow chart depicting yet another exemplary communication protocol for communicating between a home energy storage system and a user based on a vehicle charge need prediction.

FIG. 16, with continued reference to FIG. 13, illustrates a third exemplary communications method 234 for communicating between the HESS 12 and the owner/user of the electrified vehicle 20 and mobile device 166 (or the electrified vehicle 20). The communications method 234 may be used, for example, to communicate an emergency roadside charging request to the HESS 12.

First, a block 236, the user may communicate an emergency charge request to the HESS 12. The emergency charge request may be made on the mobile device 166 or by using a user interface of the electrified vehicle 20. The master controller 52 of the battery management system 50 of the HESS may then request the cloud hub 168 to send a message to the user at block 238 requesting the user to confirm the need for the emergency charging. The cloud hub 168 may send the message to the mobile device 166 or the user interface of the electrified vehicle 20 at block 240.

If the user indicates that emergency charging is not needed at block 236, the cloud hub 168 may communicate the selection to the master controller 52 at block 238. The master controller 52 of the battery management system 50 may then continue with a default charging profile at block 240.

If, alternatively, the user selects that emergency charging is required at block 242, the cloud hub 168 may communicate the selection to the master controller 52 of the HESS 12 at block 244. Next, at block 246, the master controller 52 of the battery management system 50 may request status updates from the slave controllers 54 of one or more modular units 32 of the HESS 12. The slave controllers 54 of the modular units 32 may subsequently send status information (e.g., state of charge, age status, etc.) to the master controller 52 at block 248.

The master controller 52 may, at block 250, identify the modular unit 32 having the state of charge closest to 100% and with the least amount of aging history. The master controller 52 may then request the chosen modular unit 32 to charge to the 100% state of charge and hold at that charge until being deployed for use at block 252.

Figure 17:
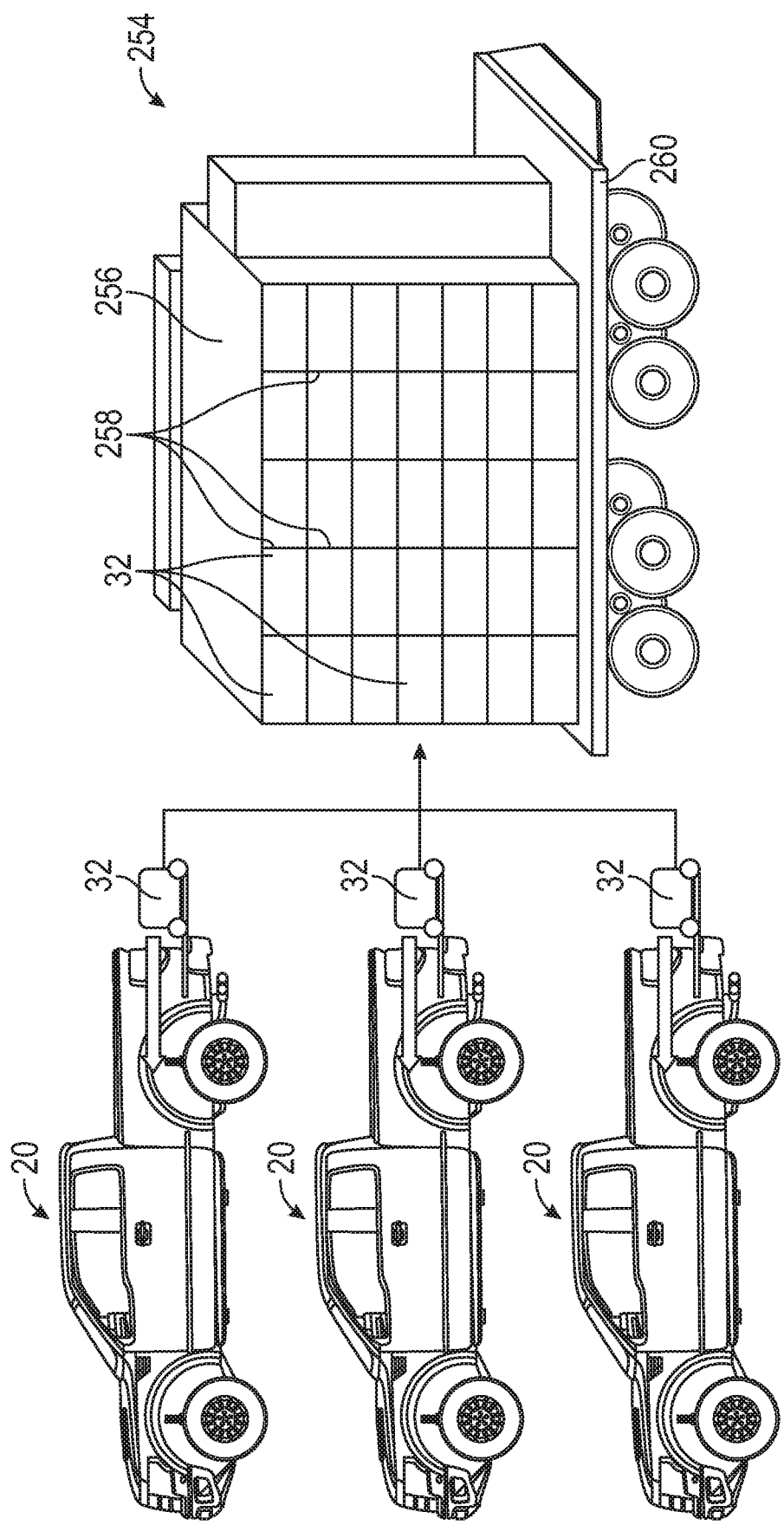
FIG. 17 illustrates an energy system that includes a plurality of interconnected modular units.

FIG. 17 illustrates an energy system 254 that can be implemented by "crowd sourcing" a plurality of modular units 32 of one or more HESSs 12. In an embodiment, the energy system 254 includes a housing 256 that includes a plurality of slots 258. Each of the slots 258 may be configured to receive at least one modular unit 32. The total numbers of slots and modular units provided within the energy system 254 is not intended to limit this disclosure. The energy system 254 may additionally include a trailer 260 for carrying and transporting the housing 256 and the modular units 32 held therein.

In an embodiment, the interconnected modular units 32 of the energy system 254 may be used to provide portable emergency power (e.g., disaster relief). In another embodiment, the interconnected modular units 32 of the energy system 254 may be used to provide adhoc power (e.g., for community events). Various alternative power source connections (e.g., wind, solar, etc.) could optionally be connected to the energy system 254 for recharging the interconnected modular units 32.

The home energy storage systems of this disclosure enable local energy storage for supporting energy consumption at a later time. The stored energy can be used for power backup, solar/wind energy storage, utility surcharging avoidance, at-home DC fast charging, etc. The disclosed home energy storage systems further enable scaled mobility solutions and support alternative energy storage/power source functionality.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A home energy storage system, comprising:
    a stationary unit;
    a modular unit removably connectable to the stationary unit;
    a rack mounting and handcart transportation system configured to mount, detach, and transport the modular unit relative to the stationary unit,
    wherein the rack mounting and handcart transportation system includes a rack assembly and a handcart assembly,
    wherein the handcart assembly is mounted to the modular unit and is adapted for transporting the modular unit along a ground surface when disconnected from the stationary unit; and
    a battery management system configured to command an increase in an allowable grid service contribution of a more degraded unit between the stationary unit or the modular unit or command a reconditioning cycle of the more degraded unit when a difference between a first usage of the stationary unit and a second usage of the modular unit over an amount of time is greater than a predefined acceptable usage difference.

2. The system as recited in claim 1, wherein the stationary unit houses at least one battery array within a sealed enclosure of the stationary unit, and the modular unit removably houses at least one modular battery or battery array.

3. The system as recited in claim 1, wherein the modular unit houses a generator.

4. The system as recited in claim 1, wherein the battery management system includes a master controller located on the stationary unit and a slave controller located on the modular unit.

5. The system as recited in claim 1, wherein the rack assembly includes a rack and an extension slidably received within a pocket of the rack.

6. The system as recited in claim 5, wherein the handcart assembly includes a handle removably connected to the extension.

7. The system as recited in claim 1, wherein the handcart assembly includes a handle attached to the modular unit, and at least one set of wheels of the handcart assembly is mounted to the modular unit.

8. The system as recited in claim 1, wherein the modular unit includes locating feet for locating the modular unit within a cargo space of a vehicle after disconnecting the modular unit from the stationary unit.

9. The system as recited in claim 8, wherein the cargo space includes locating brackets configured to receive the locating feet to align a modular unit-side connector of the modular unit with a vehicle-side connector of the vehicle.

10. The system as recited in claim 1, wherein the modular unit includes a plurality of inputs for connecting external power sources and a plurality of outputs for powering electrical devices.

11. The system as recited in claim 10, wherein the external power sources include a portable wind turbine or a portable solar panel.

12. The system as recited in claim 1, comprising a communication system configured to achieve bidirectional communication between the stationary unit, the modular unit, a mobile device, and an electrified vehicle over a cloud hub.

13. The system as recited in claim 12, wherein the mobile device is configured to communicate with the cloud hub using an application stored in a memory of the mobile device.

14. The system as recited in claim 1, wherein the modular unit is connectable to an energy system that includes a plurality of interconnected modular units after being disconnected from the stationary unit.

15. The system as recited in claim 1, wherein the rack assembly is adapted for mounting the stationary unit to a surface of a structure and includes a rack mounted between the surface and the stationary unit and an extension configured to slide within a pocket of the rack.

16. The system as recited in claim 1, wherein the handcart assembly includes a first set of wheels provided at a bottom rear edge of the modular unit and a second set of wheels provided at a bottom front edge of the modular unit.

17. The system as recited in claim 2, wherein the at least one battery array is a repurposed battery array.

18. The system as recited in claim 4, wherein the battery management system is configured to synchronize operation of the stationary unit and the modular unit when the modular unit is docked together with the stationary unit.

19. A home energy storage system, comprising:
a stationary unit;
a modular unit removably connectable to the stationary unit;
a rack mounting and handcart transportation system configured to mount, detach, and transport the modular unit relative to the stationary unit,
wherein the rack mounting and handcart transportation system includes a rack assembly and a handcart assembly,
wherein the rack assembly is adapted for mounting the stationary unit to a surface of a structure and includes a rack mounted between the surface and the stationary unit and an extension configured to slide within a pocket of the rack,
wherein the handcart assembly is mounted to the modular unit and is adapted for transporting the modular unit along a ground surface when disconnected from the stationary unit; and
a battery management system that includes a master controller located on the stationary unit and a slave controller located on the modular unit,
wherein the slave controller is configured to track a usage history of the modular unit when the modular unit is disconnected from the stationary unit and is further configured to upload the usage history to the master controller each time the modular unit is reconnected to the stationary unit.

* * * * *